(12) United States Patent
Takano

(10) Patent No.: US 9,189,104 B2
(45) Date of Patent: Nov. 17, 2015

(54) ELECTRONIC APPARATUS

(71) Applicant: PANASONIC INTELLECTUAL PROPERTY CORPORATION OF AMERICA, Torrance, CA (US)

(72) Inventor: Tomoki Takano, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/414,785

(22) PCT Filed: Jul. 2, 2013

(86) PCT No.: PCT/JP2013/004106
§ 371 (c)(1),
(2) Date: Jan. 14, 2015

(87) PCT Pub. No.: WO2014/017032
PCT Pub. Date: Jan. 30, 2014

(65) Prior Publication Data
US 2015/0177907 A1    Jun. 25, 2015

(30) Foreign Application Priority Data

Jul. 27, 2012   (JP) ................................. 2012-167304

(51) Int. Cl.
*G06F 3/041* (2006.01)
*G06F 3/01* (2006.01)
*G06F 3/0488* (2013.01)

(52) U.S. Cl.
CPC .............. *G06F 3/0418* (2013.01); *G06F 3/016* (2013.01); *G06F 3/04883* (2013.01); *G06F 3/04886* (2013.01); *G06F 2203/04101* (2013.01)

(58) Field of Classification Search
CPC ..... G06F 3/0418; G06F 3/016; G06F 3/0488; G06F 3/044; G06F 3/041; G09G 5/00
See application file for complete search history.

(56) References Cited

U.S. PATENT DOCUMENTS 8,913,024 B2 * 12/2014 Noguchi ............... G06F 3/0412
345/173
2006/0152497 A1    7/2006 Rekimoto
(Continued)

FOREIGN PATENT DOCUMENTS

JP      2003-330618      11/2003
JP      2010-128685       6/2010
(Continued)

OTHER PUBLICATIONS

Search report from International Patent Appl. No. PCT/JP2013/004106, mail date is Jul. 30, 2013.

*Primary Examiner* — Michael Faragalla
(74) *Attorney, Agent, or Firm* — Greenblum & Bernstein, P.L.C.

(57) ABSTRACT

A control unit causes a first display and a first vibration when a finger has continued to exist in a first X-Y region of a touch panel and a first Z region for a prescribed time. When the finger being in a second X-Y region of the touch panel enters a second Z region from the first Z region, the control unit activates a prescribed function and causes a second display and a second vibration. When the finger being in the second X-Y region enters the second Z region before the finger continues to exist in the first Z region for the prescribed time, the control unit causes only a third display and a third vibration without activating the prescribed function.

17 Claims, 9 Drawing Sheets

(56) References Cited

U.S. PATENT DOCUMENTS

| | | |
|---|---|---|
| 2008/0018614 A1 | 1/2008 | Rekimoto |
| 2012/0062905 A1 | 3/2012 | Kiyose |
| 2014/0104213 A1 | 4/2014 | Rekimoto |
| 2014/0240266 A1 | 8/2014 | Rekimoto |

FOREIGN PATENT DOCUMENTS

| | | |
|---|---|---|
| JP | 2010-146386 | 7/2010 |
| JP | 2010-205050 | 9/2010 |
| JP | 2011-204175 | 10/2011 |
| JP | 2012-59170 | 3/2012 |

* cited by examiner

FIG. 5
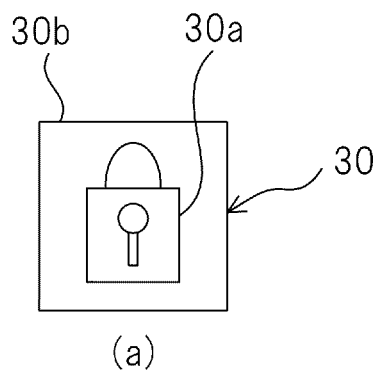
(a)
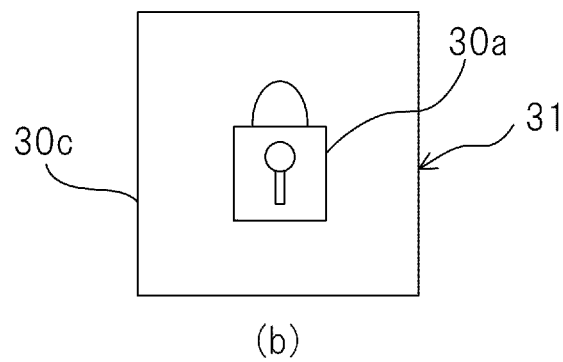
(b)
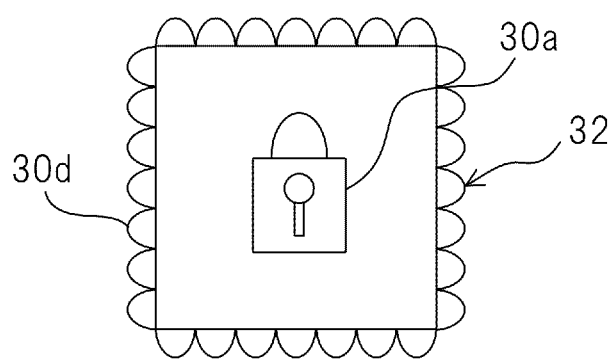
(c)

FIG. 6
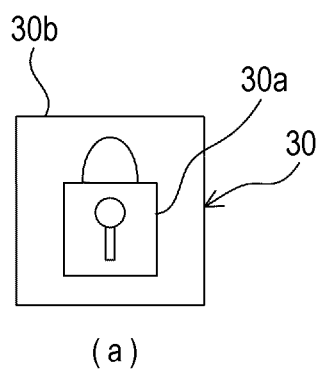
(a)
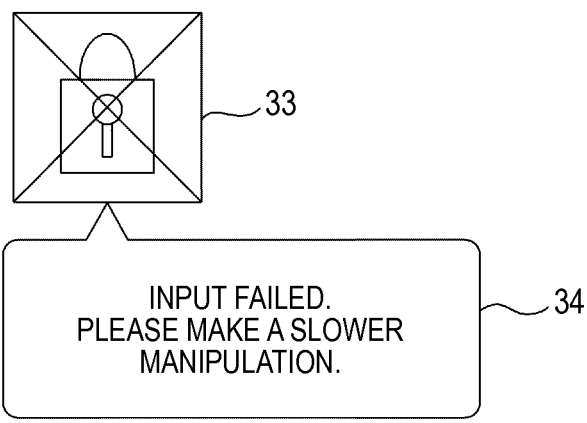
(b)

FIG. 8

| CURRENT STATE | DETECTED STATE | PROCESSING | RESULTING STATE |
|---|---|---|---|
| FUNCTION EXECUTION DISABLED | FINGER EXISTS IN FIRST X-Y REGION AND FIRST Z REGION AND PRESCRIBED TIME HAS ELAPSED | ENABLING OF FUNCTION EXECUTION<br>FIRST DISPLAY<br>FIRST VIBRATION | FUNCTION EXECUTION ENABLED |
| | FINGER EXISTS IN SECOND X-Y REGION AND SECOND Z REGION | THIRD DISPLAY (INCLUDING DISPLAY INDICATING INPUT FAILURE)<br>THIRD VIBRATION | FUNCTION EXECUTION DISABLED |
| | OTHERS | NOTHING | FUNCTION EXECUTION DISABLED |
| FUNCTION EXECUTION ENABLED | FINGER EXISTS IN FIRST X-Y REGION AND FIRST Z REGION AND PRESCRIBED TIME HAS ELAPSED | NOTHING | FUNCTION EXECUTION ENABLED |
| | FINGER EXISTS IN SECOND X-Y REGION AND SECOND Z REGION | EXECUTION OF FUNCTION<br>SECOND DISPLAY<br>SECOND VIBRATION | FUNCTION EXECUTION DISABLED |
| | OTHERS | DISABLING OF FUNCTION EXECUTION | FUNCTION EXECUTION DISABLED |

ELECTRONIC APPARATUS

TECHNICAL FIELD

The present invention relates to an electronic apparatus incorporating a touch panel.

BACKGROUND ART

An example of electronic apparatus of the above kind is disclosed in Patent document 1. The information processing apparatus disclosed in Patent document 1 includes a touch panel display which displays icons, a detection unit which detects a duration of a touch to an icon displayed on the touch panel display, and a control unit which causes the touch panel display to display a notification picture for announcing setting details of a function that is correlated with the icon according to the touch duration detected by the detection unit.

PRIOR ART DOCUMENTS

Patent Documents

Patent document 1: JP-A-2011-204175

SUMMARY OF THE INVENTION

Problems to be Solved by the Invention

Incidentally, in touch panels, only a slight touch to the screen causes activation of a function corresponding to a touch position. Therefore, an unintended touch may cause an erroneous operation.

Furthermore, in touch panels, the user cannot recognize where he or she touched the screen until a function is activated. There may occur an event that the user touches the screen at a position that is different from an intended position and an unintended function is thereby activated.

The present invention has been made in the above circumstances, and an object of the invention is therefore to provide an electronic apparatus which can suppress activation of a function that is not intended by a user in manipulation of a touch panel.

Means for Solving the Problems

An electronic apparatus according to the invention comprises a display unit and a touch panel which is placed on the display unit and can detect a distance between an instruction body and the touch panel, wherein a prescribed function corresponding to a first region and/or a second region of the touch panel is activated when the distance of the instruction body being in the second region becomes shorter than or equal to a second distance which is shorter than a first distance after a state that the instruction body exists in the first region and the distance is shorter than or equal to the first distance and longer than the second distance has lasted for a prescribed time or more; and the prescribed function is not activated when the distance of the instruction body being in the second region becomes shorter than or equal to the second distance before the state that the instruction body exists in the first region and the distance is shorter than or equal to the first distance and longer than the second distance lasts for the prescribed time or more.

In the above configuration, the prescribed function corresponding to the first region and/or the second region of the touch panel is activated when the instruction body (e.g., finger) moves to the second region the distance becomes shorter than or equal to the second distance which is shorter than the first distance after a state that the instruction body exists in the first region and the distance is shorter than or equal to the first distance and longer than the second distance has lasted for the prescribed time or more. On the other hand, the prescribed function is not activated when the instruction body moves to the second region and the distance becomes shorter than or equal to the second distance before the state that the instruction body exists in the first region and the distance is shorter than or equal to the first distance and longer than the second distance lasts for the prescribed time or more.

Therefore, the prescribed function is not activated when a manipulation of moving the instruction body fast is performed. The prescribed function is activated only when a manipulation of moving the instruction body slowly is performed. As a result, activation of a function that is not intended by a user can be suppressed in manipulation of the touch panel.

In the above configuration, the display of the display unit is changed when the prescribed function is activated.

According to this configuration, since the display of the display unit is changed when the prescribed function is activated, the user can recognize that the prescribed function has been activated.

In the above configuration, at least part of the first region coincides with the second region.

In the above configuration, the first region includes the second region.

In the above configuration, the first region and the second region coincide with each other.

In the above configuration, the first region and/or the second region corresponds to an icon that is displayed on the display unit.

In the above configuration, the second distance is equal to 0.

In the above configuration, the display unit makes a prescribed display when the distance of the instruction body being in the second region becomes shorter than or equal to the second distance after the state that the instruction body exists in the first region and the distance is shorter than or equal to the first distance and longer than the second distance has lasted for the prescribed time or more.

In this configuration, the display unit makes the prescribed display when the instruction body moves to the second region and the distance becomes shorter than or equal to the second distance after the state that the instruction body exists in the first region and the distance is shorter than or equal to the first distance and longer than the second distance has lasted for the prescribed time or more.

Therefore, the prescribed display is performed when the prescribed function is activated. As a result, the user can recognize that the prescribed function has been activated.

In the above configuration, the display unit makes a first display when the state that the instruction body exists in the first region and the distance is shorter than or equal to the first distance and longer than the second distance has lasted for the prescribed time or more; and the display unit makes a second display when thereafter the distance of the instruction body being in the second region becomes shorter than or equal to the second distance.

In this configuration, the display unit makes the first display when the state that the instruction body exists in the first region and the distance is shorter than or equal to the first distance and longer than the second distance has lasted for the prescribed time or more. The display unit makes the second display when thereafter the instruction body moves to the second region and the distance becomes shorter than or equal to the second distance.

Therefore, the user can recognize that the input by the touch manipulation has succeeded by seeing the first display and the second display.

In the above configuration, the display unit makes a third display when the distance of the instruction body being in the second region becomes shorter than or equal to the second distance before the state that the instruction body exists in the first region and the distance is shorter than or equal to the first distance and longer than the second distance lasts for the prescribed time or more.

In this configuration, the display unit makes the third display when the instruction body moves to the second region and the distance becomes shorter than or equal to the second distance before the state that the instruction body exists in the first region and the distance is shorter than or equal to the first distance and longer than the second distance lasts for the prescribed time or more.

Therefore, the user can recognize that the input by the touch manipulation has failed by seeing the third display.

In the above configuration, the third display includes at least a display to the effect that input has failed.

According to this configuration, the user can recognize that the input by the touch manipulation has failed by seeing the third display.

In the above configuration, a vibration unit is further provided, and the vibration unit makes a prescribed vibration when the distance of the instruction body being in the second region becomes shorter than or equal to the second distance after the state that the instruction body exists in the first region and the distance is shorter than or equal to the first distance and longer than the second distance has lasted for the prescribed time or more.

In this configuration, the vibration unit makes the prescribed vibration when the instruction body moves to the second region and the distance becomes shorter than or equal to the second distance after the state that the instruction body exists in the first region and the distance is shorter than or equal to the first distance and longer than the second distance has lasted for the prescribed time or more.

Therefore, the user can recognize that the input by the touch panel manipulation has succeeded by sensing the prescribed vibration.

In the above configuration, a vibration unit is further provided, and the vibration unit makes a first vibration when the state that the instruction body exists in the first region and the distance is shorter than or equal to the first distance and longer than the second distance has lasted for the prescribed time or more; and the vibration unit makes a second vibration when thereafter the distance of the instruction body being in the second region becomes shorter than or equal to the second distance.

In this configuration, the vibration unit makes the first vibration when the state that the instruction body exists in the first region and the distance is shorter than or equal to the first distance and longer than the second distance has lasted for the prescribed time or more. The vibration unit makes the second vibration when thereafter the instruction body moves to the second region and the distance becomes shorter than or equal to the second distance.

Therefore, the user can recognize that the input by the touch manipulation has succeeded by sensing the first vibration and the second vibration.

In the above configuration, the first vibration and the second vibration are the same vibration.

In the above configuration, the vibration unit makes a third vibration when the distance of the instruction body being in the second region becomes shorter than or equal to the second distance before the state that the instruction body exists in the first region and the distance is shorter than or equal to the first distance and longer than the second distance lasts for the prescribed time or more.

In this configuration, the vibration unit makes the third vibration when the instruction body moves to the second region and the distance becomes shorter than or equal to the second distance before the state that the instruction body exists in the first region and the distance is shorter than or equal to the first distance and longer than the second distance lasts for the prescribed time or more.

Therefore, the user can recognize that the input by the touch manipulation has failed by sensing the third vibration.

In the above configuration, the third vibration is the same as the first vibration and/or the second vibration.

In the above configuration, the vibration unit is at least one of a speaker, a buzzer, a vibrator, and a piezoelectric device.

An operation control method according to the invention is an operation control method which can be used in an electronic apparatus having a display unit and a touch panel which is placed on the display unit and can detect a distance between an instruction body and the touch panel, wherein a prescribed function corresponding to a first region and/or a second region of the touch panel is activated when the distance of the instruction body being in the second region becomes shorter than or equal to a second distance which is shorter than a first distance after a state that the instruction body exists in the first region and the distance is shorter than or equal to the first distance and longer than the second distance has lasted for a prescribed time or more; and the prescribed function is not activated when the distance of the instruction body being in the second region becomes shorter than or equal to the second distance before the state that the instruction body exists in the first region and the distance is shorter than or equal to the first distance and longer than the second distance lasts for the prescribed time or more.

Advantages of the Invention

The invention makes it possible to suppress activation of a function that is not intended by a user in a manipulation of a touch panel. In particular, the invention is effective when applied to persons such as aged persons who are no good at touch panel manipulation.

BRIEF DESCRIPTION OF THE DRAWINGS

FIGS. 5(a) to 5(c) show examples of a first display and a second display which are made when a finger has continued to exist in a first Z region for a prescribed time in the electronic apparatus of FIG. 1.

FIGS. 6(a) and 6(b) show examples of a third display which is made when a finger has not continued to exist in the first Z region for the prescribed time in the electronic apparatus of FIG. 1.

FIG. 8 shows operation state transitions of the electronic apparatus of FIG. 1.

MODES FOR CARRYING OUT THE INVENTION

A preferred embodiment for carrying out the present invention will be hereinafter described in detail with reference to the drawings.

Figure 1:
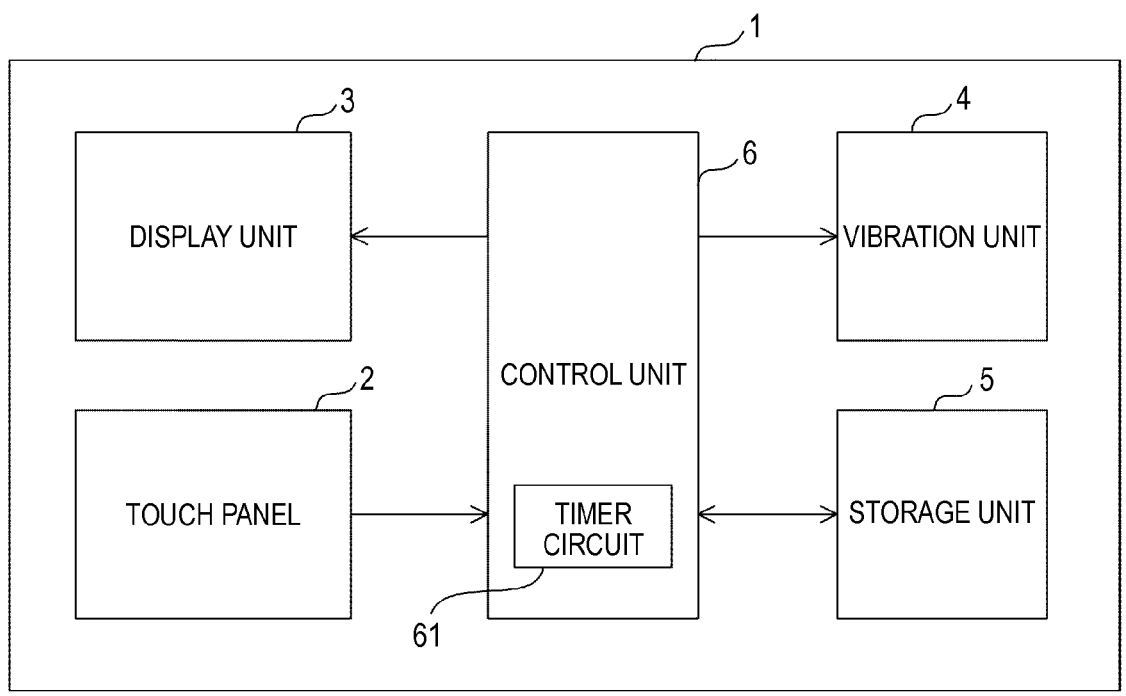
FIG. 1 is a block diagram showing a general configuration of an electronic apparatus according to an embodiment of the present invention.
Figure 2:
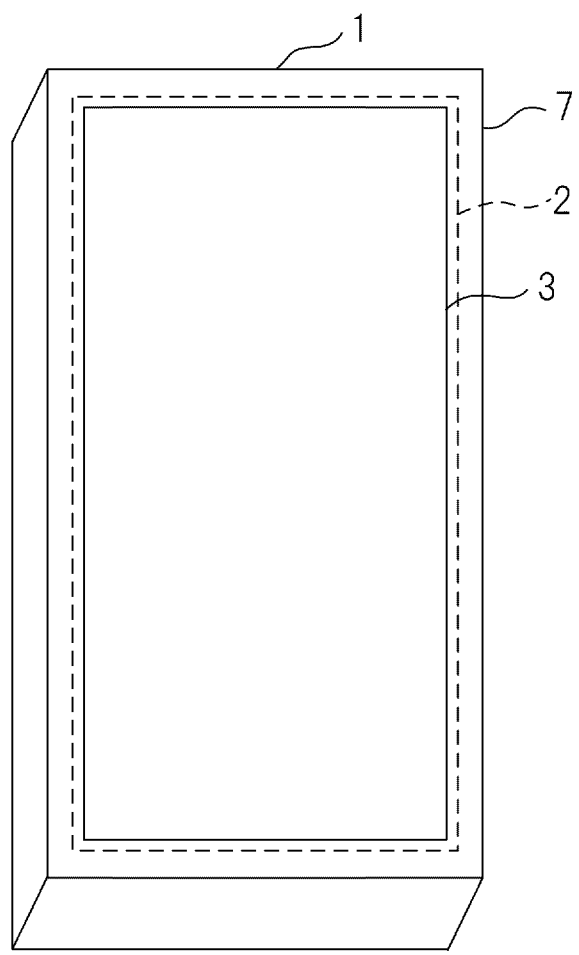
FIG. 2 is a perspective view showing an appearance of the electronic apparatus of FIG. 1.

FIG. 1 is a block diagram showing a general configuration of an electronic apparatus according to the embodiment of the invention. FIG. 2 is a perspective view showing an appearance of the electronic apparatus. The electronic apparatus 1 according to the embodiment is such that the invention is applied to, for example, a portable wireless apparatus called a smartphone, and descriptions of a communication-related part of the wireless apparatus will be omitted.

As shown in FIG. 1, the electronic apparatus 1 according to the embodiment includes a touch panel 2, a display unit 3, a vibration unit 4, a storage unit 5, and a control unit 6 which are housed in a body 7 which assumes a vertically long rectangular shape. The touch panel 2 and the display unit 3 are disposed in a front portion of the body 7. The touch panel 2 and the display unit 3 are slightly smaller than the front-side size of the body 7. The touch panel 2 is slightly larger than the display unit 3. The touch panel 2 is placed on, that is, located outside, the display unit 3.

The touch panel 2 is a capacitive type one that enables a manipulation (called a "hover manipulation") that is performed by an instruction body (user finger, pen, or the like; in the embodiment, it is assumed to be a finger) placed in a prescribed height range without being brought into contact with the panel surface. The touch panel 2 includes transmission electrodes and reception electrodes (not shown) which are disposed on the bottom surface of a plate-like dielectric body so as to be spaced from each other. Drive pulses are applied to the transmission electrodes on the basis of a transmission signal. The transmission electrodes generate electric fields when they receive drive pulses. When a finger enters a generated electric field, the number of electric field lines between a transmission electrode and a reception electrode decreases and the variation in the number of electric field lines causes a charge variation in the reception electrode. The touch panel 2 detects the finger on the basis of a reception signal that reflects the charge variation in the reception electrode, and outputs coordinate data indicating a detected finger position (X, Y, Z) to the control unit 6.

The display unit 3 has a rectangular shape and is used for displaying items for manipulation of the electronic apparatus 1, images, etc. The display unit 3 is an LCD (liquid crystal display), an organic EL (electroluminescence) display, or an electronic paper display. The vibration unit 4 is to generate a mechanical vibration and is controlled by the controller 6. The vibration unit 4 uses at least one of a speaker, a buzzer, a vibrator, and a piezoelectric device. The storage unit 5 has a volatile memory such as a DRAM (dynamic random access memory) and is used for storing a setting state of a setting made by a user to use the electronic apparatus 1.

The control unit 6 is composed of a CPU (central processing unit), a ROM (read-only memory), a RAM (random access memory), and an interface circuit. The ROM is stored with programs for controlling the CPU and the RAM is used when the CPU operates. The control unit 6 also has a timer circuit 61. The control unit 6b acquires coordinate data (X, Y, Z) from the touch panel 2, judges whether a finger is in proximity or not, and judges a position of the finger on or over the plane on the basis of the X and Y coordinate data. The control unit 6 controls the display unit 3 on the basis of the X, Y, and Z coordinate data.

Figure 3:
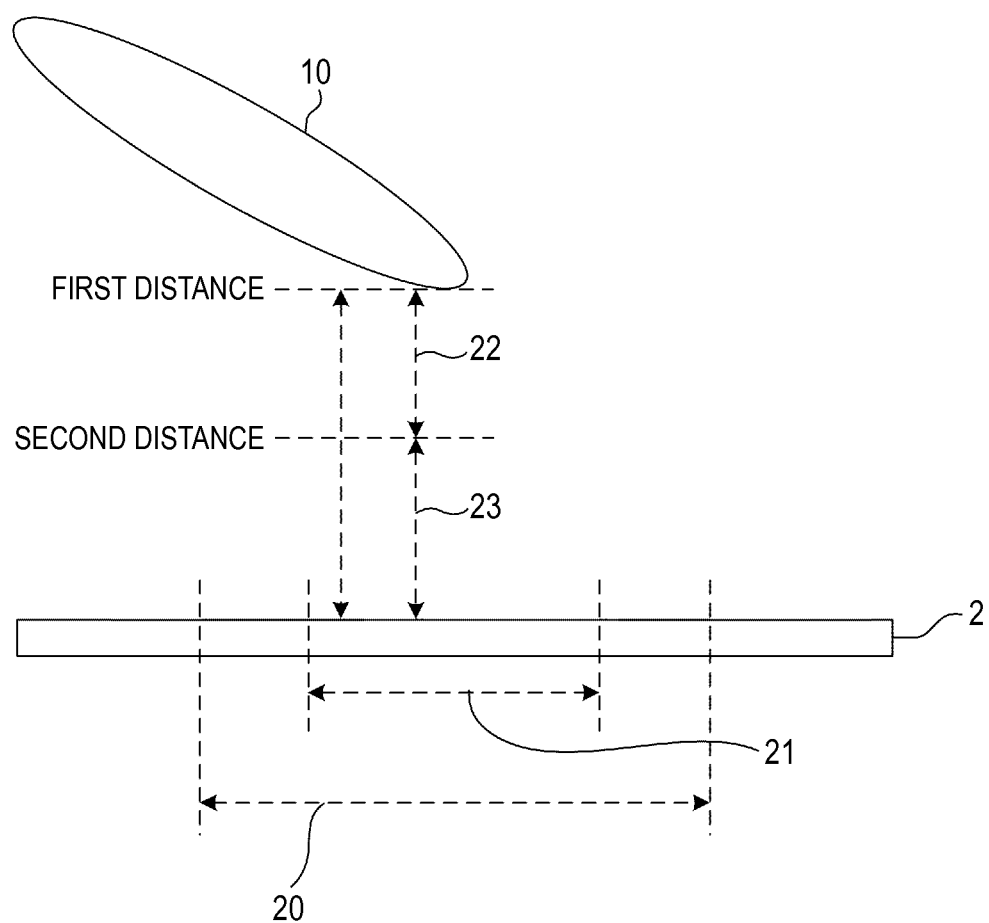
FIG. 3 shows a positional relationship between a touch panel and a finger in the electronic apparatus of FIG. 1.
Figure 4:
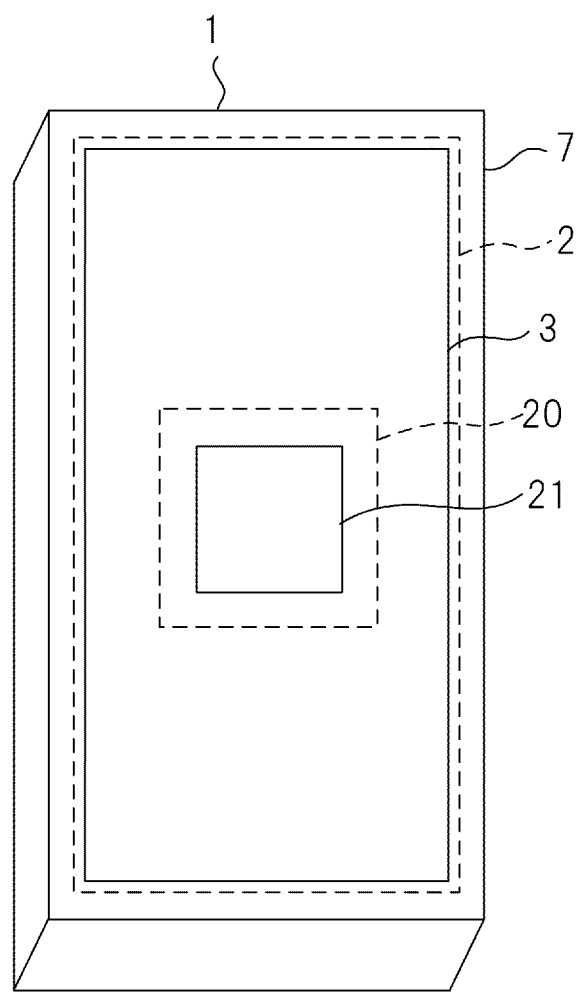
FIG. 4 is a perspective view showing a positional relationship between the first X-Y region and the second X-Y region in the electronic apparatus of FIG. 1.

Display control of the control unit 6 will now be described. FIG. 3 shows a positional relationship between the touch panel 2 and a finger 10. As shown in the figure, a first X-Y region 20 and a second X-Y region 21 which is smaller than the X-Y region 20 are set on the touch panel 2. FIG. 4 is a perspective view showing a positional relationship between the first X-Y region 20 and the second X-Y region 21. As shown in the figure, the first X-Y region 20 and the second X-Y region 21 are displayed approximately at the center of the display unit 3. The second X-Y region 21 is located inside the first X-Y region 20.

Returning to FIG. 3, the control unit 6 judges whether or not the finger 10 is located on or over the first X-Y region 20 of the touch panel 2 on the basis of X and Y coordinate data obtained from the touch panel 2. When the finger 10 is located on or over the first X-Y region 20 of the touch panel 2, then the control unit 6 judges a distance between the finger 10 and the touch panel 2. When the judged distance is shorter than or equal to a first distance (e.g., 10 mm) and longer than or equal to a second distance which is shorter than the first distance (i.e., the finger 10 is located in a first Z region 22 shown in FIG. 3), the control unit 6 measures a time for which the finger 10 continues to exist in the region 22. When a state that the finger 10 exists in the first Z region 22 has lasted for a prescribed time (e.g., 0.5 sec) or more, the control unit 6 changes the display of the display unit 3 to a first display and causes the vibration unit 4 to make a first vibration. Furthermore, when the state that the finger 10 exists in the first Z region 22 has lasted for the prescribed time or more, the control unit 6 judges a distance between the finger 10 and the touch panel 2 in the second X-Y region 21 of the touch panel 2. When the judged distance is shorter than or equal to the second distance (i.e., the finger 10 is located in a second Z region 23 shown in FIG. 3), the control unit 6 activates a prescribed function that corresponds to the first X-Y region 20 and/or the second X-Y region 21, changes the display of the display unit 3 to a second display, and causes the vibration unit 4 to make a second vibration. The user can recognize that the input by the touch panel manipulation has succeeded by seeing the first display and the second display and sensing the first vibration and the second vibration.

On the other hand, when the distance between the finger 10 and the touch panel 2 in the second X-Y region 21 of the touch panel 2 becomes shorter than or equal to the second distance (i.e., the finger 10 enters the second Z region 23 shown in FIG. 3) before the state that the distance between the finger 10 and the touch panel 2 in the first X-Y region 20 of the touch panel 2 is shorter than or equal to the first distance and longer than the second distance lasts for the prescribed time or more, the control unit 6 does not activate the prescribed function, changes the display of the display unit 3 to a third display, and causes the vibration unit 4 to make a third vibration. The user can recognize that the input by the touch panel manipulation has failed by seeing the third display and sensing the third vibration.

FIGS. 5(a) to 5(c) show examples of the first display and the second display which are made when the finger 10 has continued to exist in the first Z region 22 for the prescribed time. FIGS. 6(a) and 6(b) show examples of the third display which is made when the finger 10 has not continued to exist in the first Z region 22 for the prescribed time. As shown in FIG. 5(a), usually, an icon 30 consisting of a lock mark 30a and a rectangular frame 30b enclosing it is displayed. When the finger 10 thereafter continues to exist in the first Z region 22 for the prescribed time, as shown in FIG. 5(b) an icon 31 having a rectangular frame 30c which is larger than the rectangular frame 30b takes over. The icon 31 is the first display. When the finger 10 thereafter enters the second Z region 23, an icon 23 having a flower pattern frame 30d takes over. The icon 32 is the second display.

As shown in FIG. 6(b), when the finger 10 enters the second Z region 23 before the state that the finger 10 exists in the first X-Y region 20 and the first Z region 22 lasts for the prescribed time or more, an icon 33 with the rectangular frame 30b crossed takes over. The icon 33 is the third display. At this time, a balloon 34 is displayed which contains a message such as "Input failed. Please make a slower manipulation."

Figure 7:
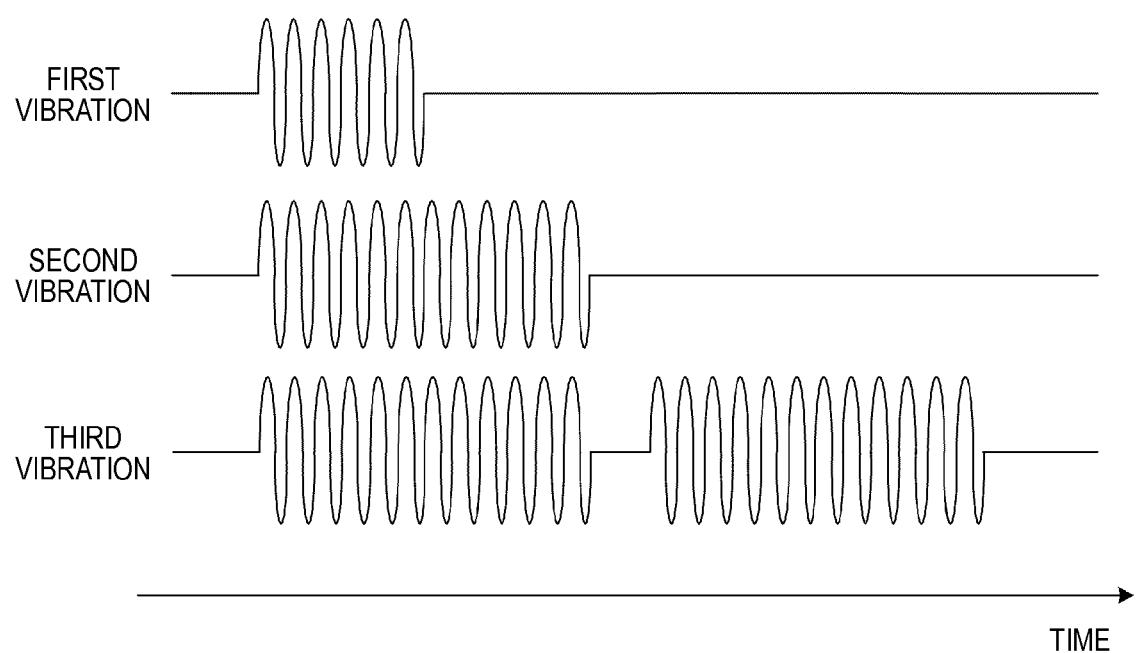
FIG. 7 shows waveforms of first to third vibrations, respectively, in the electronic apparatus of FIG. 1.

FIG. 7 shows waveforms of the first to third vibrations, respectively. As shown in FIG. 7, the first vibration has a waveform that is a single with short duration. The second vibration has a waveform that has amplitude same as that of the first vibration and is a single with duration longer than that of the first vibration. The third vibration has a waveform that is a combination of two second vibrations, wherein a short suspension period is interposed between two vibrations that are deviated from each other in time.

Figure 9:
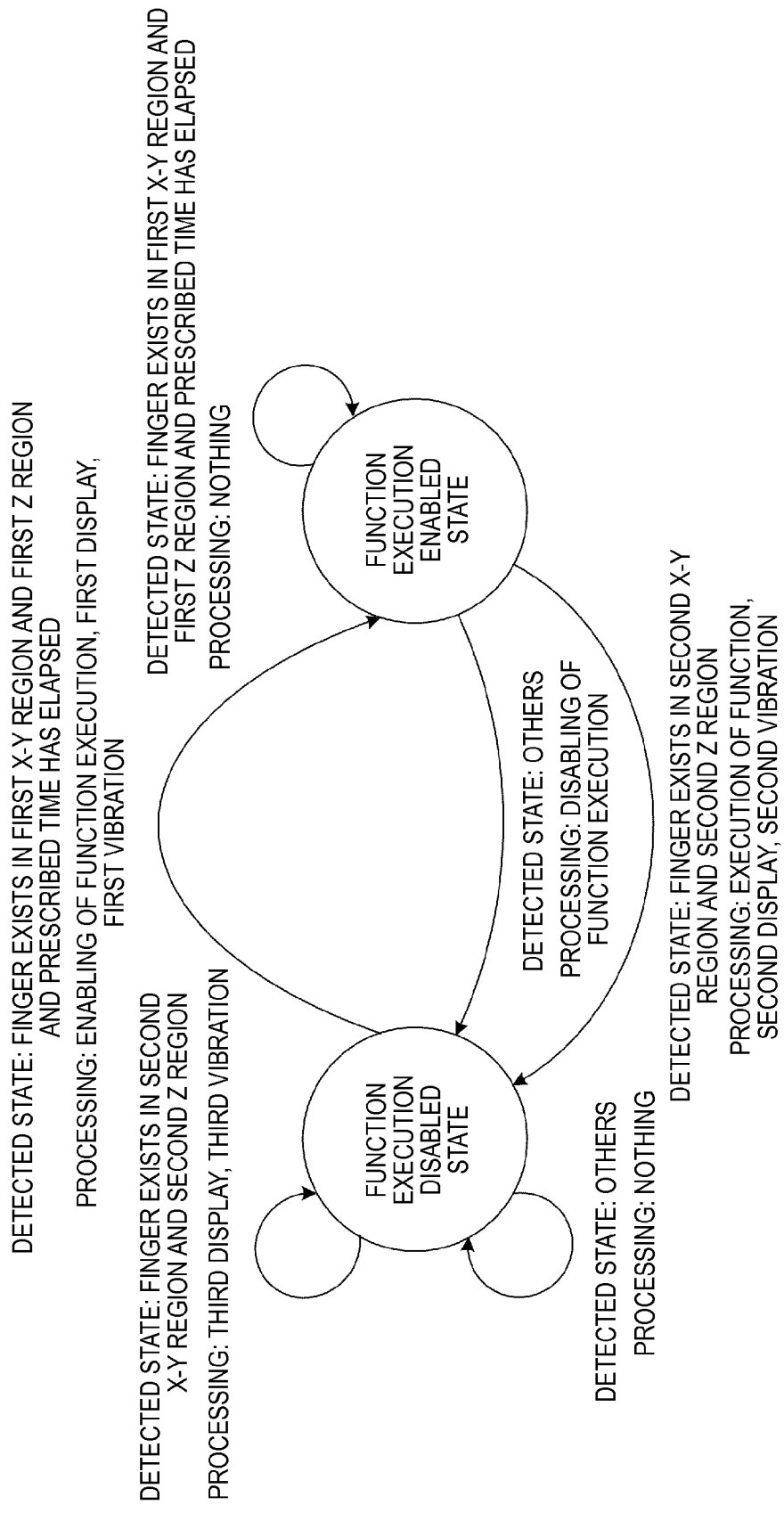
FIG. 9 also shows the operation state transitions of the electronic apparatus of FIG. 1.

FIGS. 8 and 9 show operation state transitions of the electronic apparatus 1 according to the embodiment. As shown in these figures, when a state that the finger 10 exists in the first X-Y region 20 and the first Z region 22 has lasted for the prescribed time in a function execution disabled state, processing is performed to enable function execution and make the first display and the first vibration. The resulting state is a function execution enabled state. When it is detected that the finger 10 exists in the second X-Y region 21 and the second Z region 23 in the function execution disabled state, processing is performed to make the third display and the third vibration. The resulting state is the function execution disabled state. When another state is detected in the function execution disabled state, no processing is performed. The resulting state is the function execution disabled state. On the other hand, when a state that the finger 10 exists in the first X-Y region 20 and the first Z region 22 has lasted for the prescribed time in the function execution enabled state, no processing is performed. The resulting state is the function execution enabled state. When it is detected that the finger 10 exists in the second X-Y region 21 and the second Z region 23 in the function execution enabled state, processing is performed to perform the function and make the second display and the second vibration. The resulting state is the function execution disabled state. When another state is detected in the function execution enabled state, processing is performed to disable function execution. The resulting state is the function execution disabled state.

As described above, in the electronic apparatus 1 according to the embodiment, a time is judged for which a state that the finger 10 is located in the first X-Y region 20 and the distance between the finger 10 and the touch panel 2 is shorter than or equal to the first distance and longer than the second distance which is shorter than the first distance continues. When this state has continued for the prescribed time, the display of the display unit 3 is changed to the first display and the vibration unit 4 is caused to make the first vibration. When the distance between the finger 10 existing in the second X-Y region 21 and the touch panel 2 thereafter becomes shorter than or equal to the second distance, the prescribed function corresponding to the first X-Y region 20 and/or the second X-Y region 21 is activated, the display of the display unit 3 is changed to the second display, and the vibration unit 4 is caused to make the second vibration. When the distance between the finger 10 existing in the second X-Y region 21 and the touch panel 2 becomes shorter than or equal to the second distance before the state that the distance between the finger 10 and the touch panel 2 is shorter than or equal to the first distance and longer than the second distance which is shorter than the first distance lasts for the prescribed time, the prescribed function is not activated, the display of the display unit 3 is changed to the third display, and the vibration unit 4 is caused to make the third vibration. Therefore, activation of a function that is not intended by a user can be suppressed in manipulation of the touch panel 2. That is, activation of a function that is not intended by a user can be suppressed because the function intended by the user is activated when a manipulation of moving the finger 10 slowly is performed and is not activated when a manipulation of moving the finger 10 fast is performed. Since a user can recognize whether input by a touch panel manipulation has succeeded or failed on the basis of changes in display and vibration, a more reliable input is made possible. In particular, the invention is effective when applied to persons such as aged persons who are no good at touch panel manipulation.

In the electronic apparatus 1 according to the embodiment, as shown in FIG. 7, the waveforms of all of the first to third vibrations have the same amplitude. Alternatively, they may have different amplitudes or frequencies.

The electronic apparatus 1 according to the embodiment is such that the invention is applied to a portable wireless apparatus called a smartphone. However, the invention can also be applied to apparatus other than portable wireless apparatus, such as consumer electronics appliances such as electronic ovens and operating panels of navigation apparatus etc. used in automobiles etc.

Although the invention has been described in detail by referring to the particular embodiment, it is apparent to those skilled in the art that various changes and modifications are possible without departing from the spirit and scope of the invention.

The present application is based on Japanese Patent Application No. 2012-167304 filed on Jul. 27, 2012, the disclosure of which is incorporated herein by reference.

INDUSTRIAL APPLICABILITY

Providing an advantage that activation of a function that is not intended by a user in a manipulation of a touch panel, the invention can be applied to electronic apparatus such as smartphones incorporating a capacitive touch panel.

DESCRIPTION OF SYMBOLS

1: Electronic apparatus
2: Touch panel
3: Display unit
4: Vibration unit
5: Storage unit
6: Control unit
7: Body
10: Finger
20: First X-Y region
21: Second X-Y region
22: First Z region
23: Second Z region
30, 31, 32, 33: Icon
30a: Lock mark
30b, 30c: Rectangular frame 30d: Flower pattern frame
34: Balloon
61: Timer cir.

The invention claimed is:

1. An electronic apparatus comprising:
   a display unit; and
   a touch panel which is placed on the display unit and can detect a distance between an instruction body and the touch panel,
   wherein a prescribed function corresponding to a first region and/or a second region of the touch panel is activated when the distance of the instruction body being in the second region becomes shorter than or equal to a second distance which is shorter than a first distance after a state that the instruction body exists in the first region and the distance is shorter than or equal to the first distance and longer than the second distance has lasted for a prescribed time or more; and
   wherein the prescribed function is not activated and the display unit makes at least a display to an effect that input has failed when the distance of the instruction body being in the second region becomes shorter than or equal to the second distance before the state that the instruction body exists in the first region and the distance is shorter than or equal to the first distance and longer than the second distance lasts for the prescribed time or more.

2. The electronic apparatus according to claim 1, wherein the display of the display unit is changed when the prescribed function is activated.

3. The electronic apparatus according to claim 1, wherein at least part of the first region coincides with the second region.

4. The electronic apparatus according to claim 1, wherein the first region includes the second region.

5. The electronic apparatus according to claim 1, wherein the first region and the second region coincide with each other.

6. The electronic apparatus according to claim 1, wherein the first region and/or the second region corresponds to an icon that is displayed on the display unit.

7. The electronic apparatus according to claim 1, wherein the second distance is equal to zero.

8. The electronic apparatus according to claim 1, wherein the display unit makes a prescribed display when the distance of the instruction body being in the second region becomes shorter than or equal to the second distance after the state that the instruction body exists in the first region and the distance is shorter than or equal to the first distance and longer than the second distance has lasted for the prescribed time or more.

9. The electronic apparatus according to claim 1, wherein the display unit makes a first display when the state that the instruction body exists in the first region and the distance is shorter than or equal to the first distance and longer than the second distance has lasted for the prescribed time or more; and
   wherein the display unit makes a second display when thereafter the distance of the instruction body being in the second region becomes shorter than or equal to the second distance.

10. The electronic apparatus according to claim 9, wherein the display unit makes a third display when the distance of the instruction body being in the second region becomes shorter than or equal to the second distance before the state that the instruction body exists in the first region and the distance is shorter than or equal to the first distance and longer than the second distance lasts for the prescribed time or more.

11. The electronic apparatus according to claim 1, further comprising a vibration unit,
    wherein the vibration unit makes a prescribed vibration when the distance of the instruction body being in the second region becomes shorter than or equal to the second distance after the state that the instruction body exists in the first region and the distance is shorter than or equal to the first distance and longer than the second distance has lasted for the prescribed time or more.

12. The electronic apparatus according to claim 1, further comprising a vibration unit,
    wherein the vibration unit makes a first vibration when the state that the instruction body exists in the first region and the distance is shorter than or equal to the first distance and longer than the second distance has lasted for the prescribed time or more; and
    wherein the vibration unit makes a second vibration when thereafter the distance of the instruction body being in the second region becomes shorter than or equal to the second distance.

13. The electronic apparatus according to claim 12, wherein the first vibration and the second vibration are the same vibration.

14. The electronic apparatus according to claim 1, further comprising a vibration unit,
    wherein the vibration unit makes a third vibration when the distance of the instruction body being in the second region becomes shorter than or equal to the second distance before the state that the instruction body exists in the first region and the distance is shorter than or equal to the first distance and longer than the second distance lasts for the prescribed time or more.

15. The electronic apparatus according to claim 14, wherein the third vibration is the same as the first vibration and/or the second vibration.

16. The electronic apparatus according to claim 11, wherein the vibration unit is at least one of a speaker, a buzzer, a vibrator, and a piezoelectric device.

17. An operation control method which can be used in an electronic apparatus having a display unit and a touch panel which is placed on the display unit and can detect a distance between an instruction body and the touch panel, wherein:
    a prescribed function corresponding to a first region and/or a second region of the touch panel is activated when the distance of the instruction body being in the second region becomes shorter than or equal to a second distance which is shorter than a first distance after a state that the instruction body exists in the first region and the distance is shorter than or equal to the first distance and longer than the second distance has lasted for a prescribed time or more; and
    the prescribed function is not activated and at least a display to an effect that input has failed is made by the display unit when the distance of the instruction body being in the second region becomes shorter than or equal to the second distance before the state that the instruction body exists in the first region and the distance is shorter than or equal to the first distance and longer than the second distance lasts for the prescribed time or more.

* * * * *